(12) United States Patent
Sakai et al.

(10) Patent No.: US 8,095,703 B2
(45) Date of Patent: Jan. 10, 2012

(54) DATA TRANSFER METHOD

(75) Inventors: Yasushi Sakai, Kasugai (JP); Hitoshi Ogawa, Kasugai (JP); Hideo Makabe, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 48 days.

(21) Appl. No.: 12/585,894

(22) Filed: Sep. 28, 2009

(65) Prior Publication Data

US 2010/0023656 A1 Jan. 28, 2010

Related U.S. Application Data

(63) Continuation of application No. PCT/JP2007/057179, filed on Mar. 30, 2007.

(51) Int. Cl.
*G06F 13/00* (2006.01)
*G06F 3/00* (2006.01)
*G06F 5/00* (2006.01)

(52) U.S. Cl. ............... 710/34; 710/33; 710/58; 710/61

(58) Field of Classification Search .................... None
See application file for complete search history.

(56) References Cited

U.S. PATENT DOCUMENTS

| | | | | |
|---|---|---|---|---|
| 6,157,650 | A * | 12/2000 | Okuyama et al. | 370/401 |
| 2001/0024445 | A1 * | 9/2001 | Noda et al. | 370/402 |
| 2001/0028633 | A1 * | 10/2001 | Shimada et al. | 370/252 |
| 2002/0049040 | A1 * | 4/2002 | Sugaya et al. | 455/67.1 |
| 2004/0151153 | A1 * | 8/2004 | Henry et al. | 370/346 |
| 2006/0159040 | A1 | 7/2006 | Takemoto et al. | |
| 2007/0281711 | A1 * | 12/2007 | Matta | 455/453 |

FOREIGN PATENT DOCUMENTS

| | | |
|---|---|---|
| JP | 2001-103075 | 4/2001 |
| JP | 2001-186139 | 7/2001 |
| JP | 2002-319942 | 10/2002 |
| JP | 2003-229857 | 8/2003 |
| WO | 2005/027428 A1 | 3/2005 |

OTHER PUBLICATIONS

International Search Report for PCT/JP2007/057179, mailed May 1, 2007.
English Translation of the International Preliminary Report on Patentability issued Oct. 20, 2009 in corresponding International Patent Application PCT/JP2007/057179.
Toshiya Matsui, "IEEE 1394 Hyojun Kikaku no Tokucho to Kino", Transistor Gijutsu Special No. 70, Apr. 1, 2000, pp. 12-46, English-language Translation of "The structure of a Phy packet" section.

* cited by examiner

*Primary Examiner* — Henry Tsai
*Assistant Examiner* — Kris Rhu
(74) *Attorney, Agent, or Firm* — Fujitsu Patent Center

(57) ABSTRACT

There is provided a data transfer method in an IEEE1394 system including a band request node and a transfer band management node. The method includes generating, at the band request node, a transfer request that can detect a data amount of transfer data and transmitting the transfer request from the band request node to the transfer band management node, determining, by the transfer band management node, whether a transfer band requested by the transfer request is ensured or not, notifying, from the transfer band management node, the band request node of the determination result, and transferring data from the band request node according to the determination result.

8 Claims, 3 Drawing Sheets

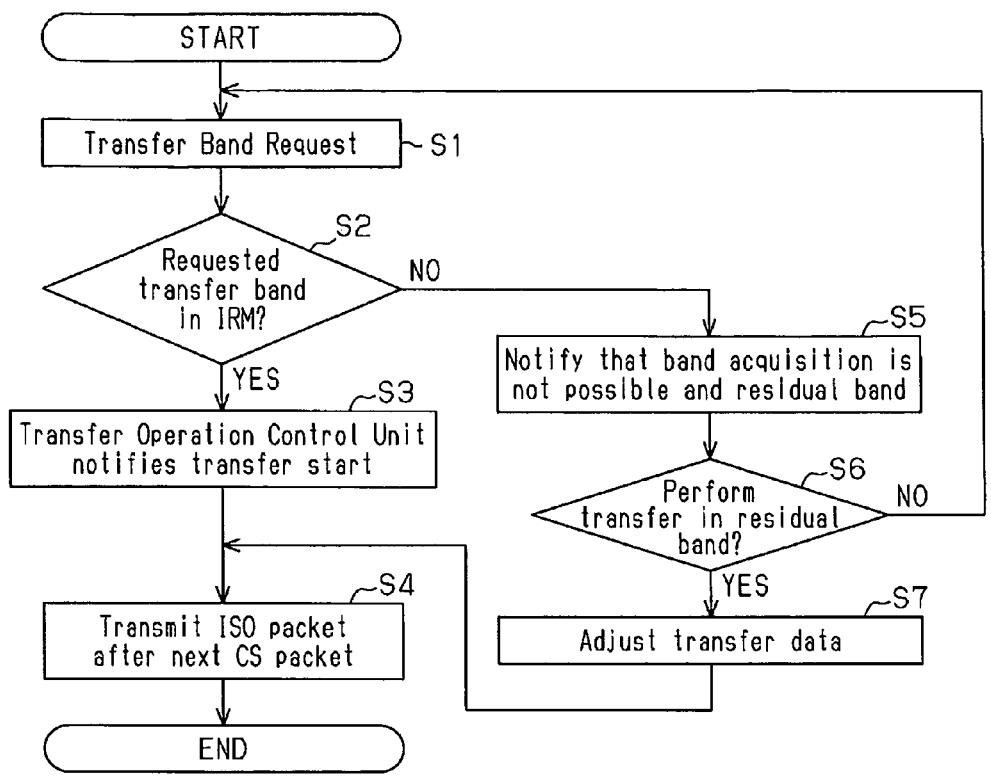
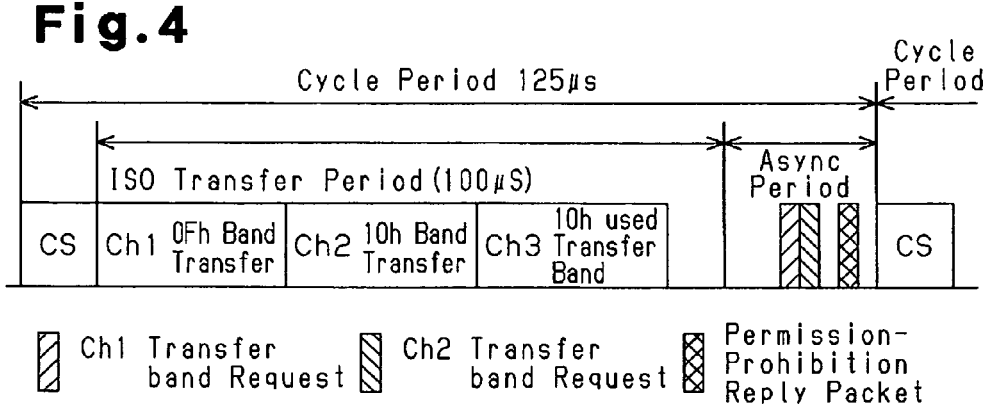

Fig.5
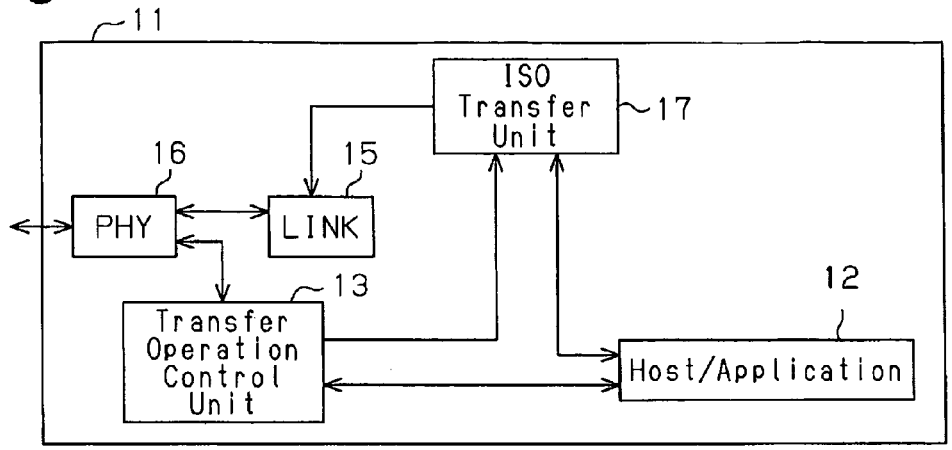
Fig.6
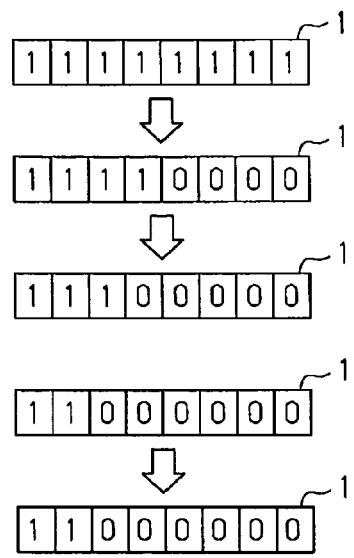
Fig.7
CS:Cycle Start Packet (125μs Cycle)
| CS | Ch1 0Fh Band Transfer | Ch2 10h Band Transfer | Ch3 20h Band Transfer | CS |
|---|---|---|---|---|
Fig.8
| CS | Ch1 0Fh Band Transfer | Ch2 10h Band Transfer | 10h Used Transfer band | Unused Transfer band | CS |
|---|---|---|---|---|---|//← Ch3 20h Band Transfer →

DATA TRANSFER METHOD

CROSS-REFERENCE TO RELATED APPLICATIONS

This non-provisional application is a continuation application of and claims the benefit of International Application No. PCT/JP2007/057179, filed on Mar. 30, 2007, the entire contents of which are incorporated herein by reference.

FIELD

The embodiment discussed herein relates to a data transfer method in an IEEE 1394 system.

In an IEEE 1394 system, a plurality of transfer nodes request acquisition of transfer bands, and data is transferred in the transfer bands acquired by the nodes. The transfer band acquired by each node does not necessarily correspond to the amount of data that is to be transferred from the node. For example, when the amount of data actually transferred from a node is less than an initially expected data amount, the transfer band acquired by the node may include an unused transfer band. Therefore, it is necessary to acquire a transfer band corresponding to the transfer data amount to improve the data transfer efficiency, that is, the usage efficiency of the transfer band.

BACKGROUND

When performing synchronous transfer (isochronous transfer) of data between nodes, a transmission channel and a transfer band can be acquired by an isochronous resource manager (IRM). The usable transfer band is managed by referring to a band indication register included in the isochronous resource manager.

Referring to FIG. 6, a band management operation performed by referring to the band indication register will now be described. An isochronous resource manager includes, for example, eight-bit band indication registers 1. In the band indication registers 1, FFh (in which h expresses a hexadecimal number) is set as an initial value for a data transferrable band value.

In this state, when node 1 acquires a transfer band of 0Fh in transmission channel ch1, the residual band indicated by the band indication register becomes F0h. Then, when node 2 acquires a transfer band of 10h in transmission channel ch2, the residual band indicated by the band indication register becomes E0h. Then, when node 3 acquires a transfer band of 20h in transmission channel ch3, the residual band is further indicated by the band indication register.

In this state, even if a further node attempts to acquire a transfer band, the residual band indicated in the transferrable band is less than F0h. Thus, the further node cannot acquire a transfer band, and data transfer cannot be performed. The band indication register 1 only indicates the usable transfer band and does not function to control the transfer band.

Referring to FIG. 7, the transfer operation of the nodes 1 to 3 that acquired transfer bands as described above will now be discussed. One cycle of the transfer operation, that is, the transfer interval of cycle start packets CS is 125 µs. In a manner following the first cycle start packet CS, the data of node 1 is transferred in the 0Fh band of channel ch1, which is allocated to node 1. Then, the data of node 2 is transferred in the 10h band of channel ch2, which is allocated to node 2. Then, the data of node 3 is transferred in the 20h band of channel ch3, which is allocated to node 3.

In such a transfer operation, the bands acquired in channels ch1 to ch3 do not increase or decrease in correspondence with the data amount during data transfer. For example, as illustrated in FIG. 8, the data that is to be transferred by node 3 in channel ch3 is compressed prior to transfer. This reduces the data in size and narrows the band required for transfer. In this case, the transfer band for 20 h has already been acquired for channel ch3. Thus, an unused band may remain in the transfer band of channel ch3. The unused band lowers the transfer efficiency.

SUMMARY

An aspect of the embodiment provides a data transfer method in an IEEE 1394 system including a band request node and a transfer band management node. The method includes generating with the band request node a transfer request enabling detection of a data amount of transfer data in the band request node, transmitting the transfer request to the transfer management node from the band request node, determining with the transfer band management node whether or not a transfer band requested by the transfer request is acquirable, sends back the determination result in a reply signal from the transfer band management node to the band request node, and transfers data from the band request node based on the reply signal.

In one embodiment, the band request node generates the transfer request by calculating a requested band from the data amount of the transfer data and transmits the transfer request to the transfer band management node in an asynchronous packet.

In one embodiment, the transfer management node includes a band management register which stores a present residual band, refers to the band management resister to determine whether or not a requested band of the transfer request is acquirable, and sends back the determination result in an asynchronous packet to the band request node.

In one embodiment, the transfer band management node notifies the band request node of a presently acquirable band when the requested band of the transfer request cannot be acquired, and the band request node performs data transfer using the presently acquirable band.

In one embodiment, the band request node generates data adjusted to a size transferrable in the presently acquirable band that is smaller than the requested band and transfers the adjusted data in the presently acquirable band.

In one embodiment, the band request node transmits a PHY packet stored in the transfer request to the transfer band management node, analyzes with a physical layer the reply packet sent back from the transfer band management node, and controls data transfer in accordance with the analysis result.

A further aspect of the embodiment is an IEEE 1394 data transfer device. The device includes a band request node, which generates a transfer request that requests a band for transferring data, and a transfer band management node coupled to the band request node via an IEEE 1394 bus. The transfer band management node receives the transfer request from the band request node, determines whether or not the requested band is acquirable based on the transfer request, and transmits a reply signal indicating the determination result to the band request node. The band request node performs the transfer of data in accordance with the reply signal.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The invention, together with objects and advantages thereof, may best be understood by reference to the following description of the presently preferred embodiments together with the accompanying drawings in which:

FIG. 3 is a flowchart of a data transfer process performed by the band request node and the transfer band management node;

FIG. 4 is a diagram illustrating a transfer operation timing of the band request node and the transfer band management node;

FIG. 5 is a block diagram illustrating a band request node according to a second embodiment;

FIG. 6 is a diagram illustrating the operation of a band management register;

FIG. 7 is a diagram illustrating data transfer in a related art; and

FIG. 8 is a diagram illustrating data transfer in a related art.

DESCRIPTION OF EMBODIMENTS

Figure 1:
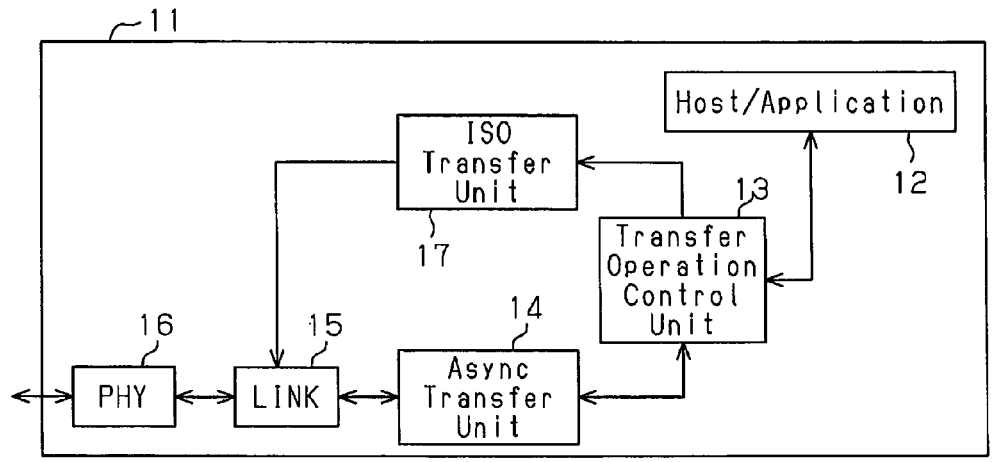
FIG. 1 is a block diagram illustrating a band request node according to a first embodiment.

A first embodiment of a method and device for transferring data according to the embodiment will now be discussed. FIG. 1 depicts an example of a transfer node (band request node) in an IEEE 1394 system. The transfer node 11 includes a transfer operation control unit 13 arranged between a host/application block (Host/Application) 12 and an asynchronous transfer unit (Async transfer unit) 14. The host/application block 12 provides the transfer operation control unit 13 with transfer commands and transfer data. The transfer operation control unit 13 detects the data amount of the transfer data received from the host/application block 12, calculates a request transfer band in correspondence with the detected data amount, and provides the asynchronous transfer unit (Async transfer unit) with the calculated request transfer band and a transfer request.

The asynchronous transfer unit 14 generates an asynchronous packet (Async packet), which stores the request transfer band and the transfer request. The asynchronous packet is output from the transfer node 11 via a link layer (LINK) 15 and a physical layer (PHY) 16 and provided to a transfer band management node, which includes an isochronous resource manager (IRM) via an IEEE 1394 bus.

The transfer operation control unit 13 provides an ISO transfer unit (synchronous transfer unit) 17 with the input transfer data. The ISO transfer unit 17 outputs the received transfer data as synchronous transfer data. The synchronous transfer data, which is output from the transfer node 11 via the link layer 15 and the physical layer 16, is provided to a destination node via the IEEE 1394 bus.

The transfer operation control unit 13 includes a code module, which compresses the transfer data provided from the host/application block 12, and a transfer buffer, which counts the data amount of the compressed transfer data. The transfer operation control unit 13 further inserts the data amount counted by the transfer buffer in the transfer request and sends the transfer request to the asynchronous transfer unit 14.

Figure 2:
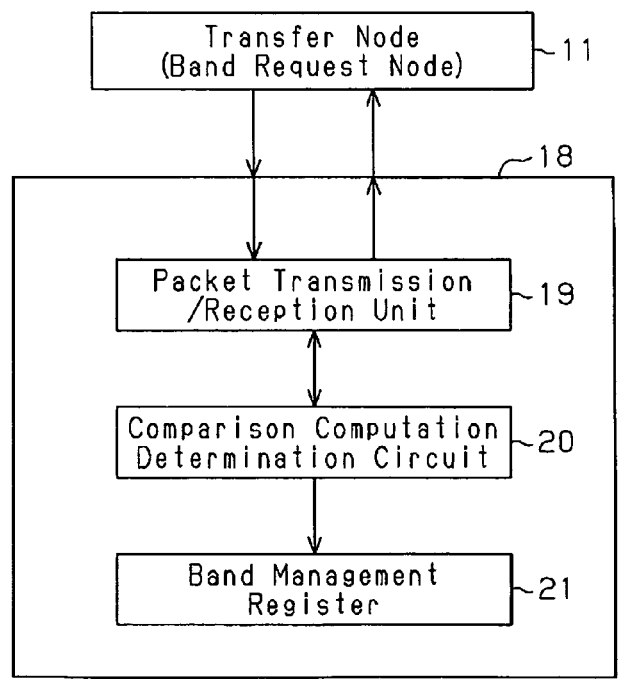
FIG. 2 is a block diagram illustrating a transfer band management node according to the first embodiment.

FIG. 2 depicts an IEEE 1394 transfer device including the transfer node (band request node) 11 and a transfer band management node 18. The transfer band management node 18 includes as the IRM a packet transmission and reception unit 19, a comparison computation determination circuit 20, and a band management register 21. Further, the transfer band management node 18 has a transfer band management function.

The packet transmission and reception unit 19 receives the band request packet output from the band request node 11, determines the request node and the requested band, and provides the determination information to the comparison computation determination circuit 20.

The comparison computation determination circuit 20 refers to the present residual band stored in the band management register 21 and determines whether or not the requested band notified from the band request node 11 can be acquired. When acquisition of the requested band is possible, the comparison computation determination circuit 20 provides the packet transmission and reception unit 19 with a determination result indicating that transfer is possible. The packet transmission and reception unit 19 transmits a reply packet storing the determination result indicating that transfer is possible to the band request node.

When a new band is acquired, the comparison computation determination circuit 20 updates a band acquisition status that is displayed on the band management register 21.

When acquisition of the band requested by the band request node is not possible, the comparison computation determination circuit 20 provides the packet transmission and reception unit 19 with a reply packet storing a determination result indicating that transfer is not possible. Then, the packet transmission and reception unit 19 transmits the reply packet to the band request node.

In this state, the comparison computation determination circuit may transmit a reply packet storing the presently acquirable band.

The transfer operation of the transfer node (band request node) 11 and the transfer band management node 18 will now be discussed with reference to FIG. 3. When the transfer operation starts, the transfer operation control unit 13 of the band request node 11 outputs a transfer band request (S1). As illustrated in FIG. 4, the transfer band request is transmitted during an asynchronous transfer period (Async period) of one cycle of a transfer period, which has 125 µs.

Next, the transfer band management node 18, which receives the transfer band request, determines whether or not the requested band in the received transfer band request is acquirable (S2). When the requested band is acquirable, a reply packet indicating a transfer permission is sent back to the band request node 11 during the Async period. The transfer operation control unit 13 of the band request node 11 receiving the reply packet notifies a destination node to start transfer (S3).

Then, following the next cycle start packet CS, the band request node 11 transmits transfer data with a synchronous packet (ISO packet) (S3) and ends the transfer operation in the present cycle.

In S2, when the requested band cannot be obtained (NO), the transfer band management node 18 transmits to the band request node 11 a reply packet indicating that transfer is not possible (S5). In addition to information indicating that transfer is not possible, the reply packet stores the presently acquirable band (residual band) that is less than the requested band.

Next, in response to the reply packet, the band request node 11 determines whether or not to perform transfer in the residual band that is smaller than the requested band (S6). When performing transmission with the residual band, transfer data adjusted to a transferable size in the residual band is generated (S7). Then, the processing proceeds to S4.

Further, when determined that transfer will not be performed in the residual band in S6, the processing proceeds to S1 and a band request is generated again in the next transfer cycle.

The data transfer method and data transfer device in the IEEE 1394 system has the advantages described below.

(1) The band request node 11 requests the transfer band management node 18 for a transfer band, and the transfer band management node 18 determines whether or not the requested band can be acquired. If the requested band can be acquired, the transfer band management node 18 sends back a transfer permission signal to the band request node 11. In response to the transfer permission signal, the band request node 11 starts a transfer operation. Accordingly, a transfer channel for a band corresponding to the requested band is acquired. This prevents an unused band from being produced in each transfer channel and improves the usage efficiency of the transfer band.

(2) The transfer request node 11 includes the transfer operation control unit 13, which generates a transfer band request for requesting a transfer band that is in correspondence with the amount of data that is to be transferred, and transmits the transfer band request as a packet signal to the transfer band management node 18. Thus, even when the data that is to be transferred is compressed, a suitable transfer band corresponding to the amount of the compressed transfer data may be requested.

(3) The transfer band management node 18 includes the comparison computation determination circuit 20, which determines whether or not the band requested by the transfer band request is acquirable based on the present residual band stored in the band management register 21. The determination result may be sent back in a reply packet to the band request node 11.

(4) The transfer band request and its reply packet is transmitted and received in asynchronous packets. Thus, an ISO transfer band is not affected.

(5) Even if the requested band of the band request node 11 cannot be acquired, the transfer operation control unit 13 may adjust the size of the transfer data so that it can be transmitted in a residual band that is smaller than the requested band. This improves the transfer efficiency of data. Particularly, the usage efficiency of the transfer band may be maximized by having the transfer operation control unit 13 adjust the transfer data to be exactly the same as the residual band.

FIG. 5 depicts a band request mode according to a second embodiment. A transfer operation control unit 13 is coupled to a physical layer 16. The transfer operation control unit 13 provides the physical layer 16 with the generated transfer request and transfers the transfer request as a PHY packet from the physical layer 16 to a transfer band management node 18.

The physical layer 16 analyzes a reply packet from the transfer band management node 18. The analysis result from the physical layer 16 is provided to the transfer operation control unit 13. Based on the analysis result, the transfer operation control unit 13 controls an ISO transfer unit 17.

In the first embodiment, when transmitting and receiving the transfer request with an asynchronous packet, analysis of the reply packet is performed by the physical layer 16, the link layer 15, and the Async transfer unit 14. Based on the analysis result, the transfer operation control unit 13 controls the transfer operation of the ISO transfer unit 17. In the second embodiment, analysis of the reply packet is performed by the physical layer 16. Based on the analysis result, the transfer operation control unit 13, which is directly coupled to the physical layer 16, controls the transfer operation of the ISO transfer unit 17. Thus, the time from when the reply packet is received to when the transfer operation is controlled may be reduced.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A data transfer method in an IEEE 1394 system including a band request node and a transfer band management node, the method comprising:
    generating a transfer request for requesting a transfer band corresponding to a data amount of transfer data in the band request node;
    transmitting the transfer request to the transfer management node from the band request node during an asynchronous transfer period of one cycle of an IEEE 1394 transfer period;
    determining with the transfer band management node whether or not the transfer band requested by the transfer request is acquirable;
    sending back the determination result in a reply signal from the transfer band management node to the band request node during the asynchronous transfer period; and
    transferring data from the band request node based on the reply signal during a synchronous transfer period of a next cycle of the cycle.

2. The data transfer method according to claim 1, wherein the band request node generates the transfer request by calculating a requested band from the data amount of the transfer data and transmits the transfer request to the transfer band management node in an asynchronous packet.

3. The data transfer method according to claim 1, wherein the transfer management node:
    includes a band management register which stores a present residual band;
    refers to the band management register to determine whether or not a requested band of the transfer request is acquirable; and
    sends back the determination result in an asynchronous packet to the band request node.

4. The data transfer method according to claim 3, wherein:
    the transfer band management node notifies the band request node of a presently acquirable band when the requested band of the transfer request cannot be acquired; and
    the band request node performs data transfer using the presently acquirable band.

5. The data transfer method according to claim 3, wherein:
    the presently acquirable band is smaller than the requested band;

the band request node generates data adjusted to a size transferrable in the presently acquirable band and transfers the adjusted data in the presently acquirable band.

6. The data transfer method according to claim 1, wherein the band request node:

transmits a PHY packet stored in the transfer request to the transfer band management node;

analyzes with a physical layer the reply packet sent back from the transfer band management node; and controls data transfer in accordance with the analysis result.

7. The data transfer method according to claim 1, wherein the transmitting the transfer request and the sending back the determination result are performed during the same asynchronous transfer period that is followed by the synchronous transfer period of the next cycle in which the data is transferred.

8. An IEEE 1394 data transfer device comprising:

a band request node which generates a transfer request that requests a transfer band corresponding to a data amount of transfer data and transmits the transfer request during an asynchronous transfer period of one cycle of an IEEE 1394 transfer period; and a transfer band management node coupled to the band request node via an IEEE 1394 bus, in which the transfer band management node receives the transfer request from the band request node, determines whether or not the transfer band requested by the transfer request is acquirable, and transmits a reply signal indicating the determination result to the band request node during the asynchronous transfer period;

wherein the band request node performs the transfer of data in accordance with the reply signal during a synchronous transfer period of a next cycle of the cycle.

* * * * *